United States Patent [19]

Pan et al.

[11] 4,287,472

[45] Sep. 1, 1981

[54] METHOD FOR MEASURING THE THICKNESS OF AN ICE SHEET

[75] Inventors: Robert B. Pan; John S. Templeton, III, both of Houston, Tex.

[73] Assignee: Exxon Production Research Company, Houston, Tex.

[21] Appl. No.: 126,587

[22] Filed: Mar. 3, 1980

[51] Int. Cl.³ ............................................. G01R 27/02
[52] U.S. Cl. .................................. 324/65 R; 340/580; 340/620
[58] Field of Search ..................... 324/65 R, 65 P; 73/304 R, 190 A; 340/580, 620

[56] References Cited

U.S. PATENT DOCUMENTS

| Re. 23,493 | 5/1952 | Edelman | 73/304 |
|---|---|---|---|
| 829,161 | 8/1906 | Kjerulff | 73/304 |
| 1,049,952 | 1/1913 | Walton | 73/304 X |
| 1,532,871 | 4/1925 | Bloch | 324/63 |
| 2,138,677 | 11/1938 | Meyer | 73/304 X |
| 2,357,023 | 8/1944 | Reid et al. | 73/304 |
| 2,632,308 | 3/1953 | Engelhardt | 340/580 X |
| 2,761,320 | 9/1956 | Duntley | 73/170 A |
| 2,797,284 | 6/1957 | Brooke | 73/304 X |
| 2,843,823 | 7/1958 | Bayless | 73/304 X |
| 2,919,579 | 1/1960 | Gronner | 73/304 |
| 3,342,138 | 9/1967 | Parks et al. | 340/618 X |
| 3,395,908 | 8/1968 | Woodcock | 324/65 R X |
| 3,477,460 | 11/1969 | Dotto | 340/620 X |
| 3,484,805 | 12/1969 | Lorenz | 340/580 X |
| 3,498,131 | 3/1970 | Rickey | 73/304 |
| 3,548,304 | 12/1970 | Lohnes | 324/65 R |
| 3,667,296 | 6/1972 | Schiefer et al. | 73/304 R |
| 3,735,638 | 5/1973 | Miller | 73/304 R |
| 3,755,804 | 8/1973 | Johnson | 340/620 |
| 3,790,936 | 2/1974 | Knoll | 340/620 |
| 3,812,422 | 5/1974 | De Carolis | 73/304 R X |
| 3,974,695 | 8/1976 | Lerner | 73/304 C |
| 4,037,761 | 7/1977 | Kemlo et al. | 73/304 R X |

Primary Examiner—Stanley T. Krawczewicz
Attorney, Agent, or Firm—Marc L. Delflache

[57] ABSTRACT

A method for measuring the thickness of an ice sheet is disclosed. The resistance of an electric circuit embedded in an ice sheet floating at the surface of a body of water is measured. A relationship between the measured electric resistance and the ice sheet thickness is possible because sea ice has a much larger resistance than sea water and, therefore, acts as an insulator. Thus, the resistance of the circuit is altered by the vertical location of the water's surface on the circuit.

8 Claims, 3 Drawing Figures

METHOD FOR MEASURING THE THICKNESS OF AN ICE SHEET

BACKGROUND OF THE INVENTION

1. Field of the Invention

This invention relates to a method for measuring the thickness of an ice sheet. More particularly, this invention relates to a method for continuously measuring the thickness of an ice sheet in an arctic environment.

2. Description of the Prior Art

As the exploration for oil and gas expands into the offshore arctic regions, it is occasionally necessary to measure the thickness of a floating ice sheet for various reasons such as the development of design criteria for offshore structures.

In the past, ice thickness has been determined directly by borings or indirectly by radar, magnetic induction or ice temperature measurements. However, while each of these methods has its particular advantages, each method does have certain distinct disadvantages.

Drilling a hole requires that the hole be kept clean and open. In addition, measurements must be made at predetermined intervals to continuously monitor the thickness of the ice sheet.

The radar method uses a source and receiver located above the ice sheet. A signal is refracted by the interface between the bottom of the ice sheet and the sea. However, occasionally a second interface between the ice sheet and water on top of the sheet resulting from melting ice interferes with the results.

The magnetic induction method is described in a paper by P. Hockstra and A. Santorelli entitled "Low Frequency Methods for Measuring Sea Ice Thickness" presented at the International Workshop on Remote Estimation of Sea Ice Thickness in Newfoundland, Canada on Sept. 24-25, 1979. Basically, this method uses a magnetic dipole transmitter and receiver spaced apart, yet located on the top of the ice sheet. The transmitter is used to induce an eddy current in the ice sheet which the magnetic dipole receiver measures. The thickness is determined by comparing the measurement made by the receiver with a reference point such as the measurement of an eddy current in open air. However, indications are that the measurements made by the receiver may vary as much as 35% from the actual thickness of the ice sheet.

The ice temperature measurement method uses a number of temperature measurements through the depth of the ice sheet and sea water below. In this method, the location of the bottom of the ice sheet is determined from the ice temperature gradient and the water temperature. However, the ice temperature method is unreliable because it depends on the occurrence of both a significant ice temperature gradient and a constant water temperature, either of which conditions may fail to exist. The ice temperature method also places a heavy burden on the field data acquisition program because of the large number of temperature measurements which must be made.

Therefore, the need exists for an improved method for measuring the thickness of an ice sheet which is inexpensive, accurate and reliable.

SUMMARY OF THE INVENTION

The present invention is an improved ice measuring method which employs a resistance probe to monitor ice sheet thickness.

Briefly, the invention calls for initially transmitting an electric current through a circuit embedded in an ice sheet. Sea ice has a high electric resistance compared to sea water, and therefore, the ice acts as an insulator. Sea water, because of its low resistance or high conductivity, reduces the effective length of the circuit and thereby decreases its overall resistance. The electric resistance of the circuit is then measured, and the thickness of the ice sheet determined by correlating the measured resistance of the circuit with predetermined calibrated ice thickness values.

In the modification of the present invention, the determination of the ice sheet thickness is made over a predetermined length of time in order to continuously monitor the thickness of the ice sheet. In this manner, data can be acquired over an entire winter season.

BRIEF DESCRIPTION OF THE DRAWINGS

In order to more fully understand the figures discussed in the detailed description of the present invention, a brief description of each figure is provided.

DETAILED DESCRIPTION OF THE PREFERRED EMBODIMENT

Basically, the present invention is a method for measuring the thickness of an ice sheet floating at the surface of a body of water. As mentioned above, sea ice has a particularly high electric resistance in comparison to that of sea water (approximately $10^6$ times greater than sea water). Thus, the use of an electric circuit is particularly well suited due to the dissimilar resistant characteristics of the two media (ice and water). A type of probe having an electric circuit which could be employed in the practice of the present invention is disclosed by Miller in U.S. Pat. No. 3,735,638 which is hereby incorporated by reference.

Figure 1:
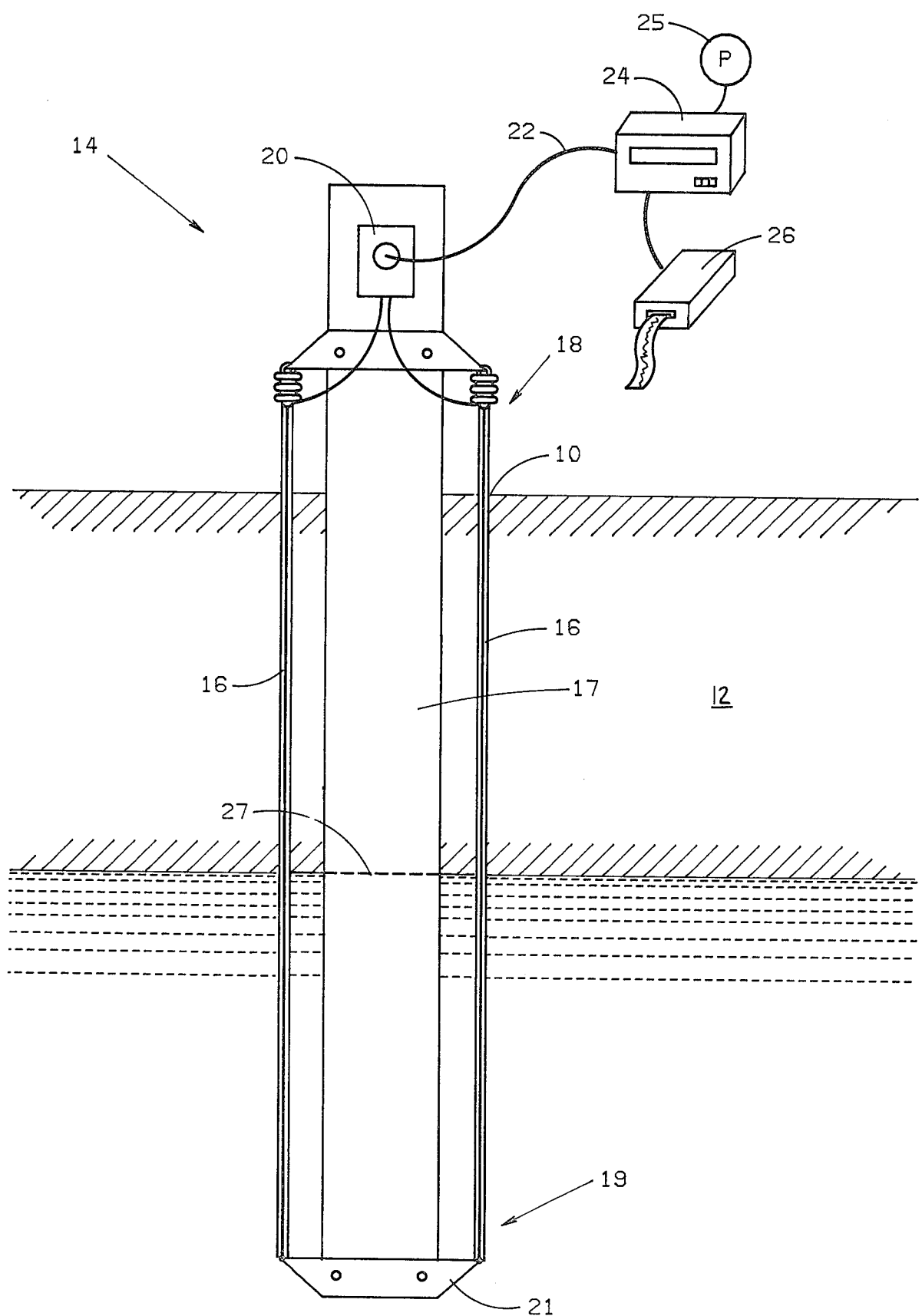
FIG. 1 is a sectional view of an electric resistance probe embedded in an ice sheet.

Referring to FIG. 1, an electric resistance probe 14 is illustrated embedded in an ice sheet 12. A hole 10 in which to place the probe may be initially excavated through the ice sheet 12 by an auger or the like. Alternatively, an existing opening in the ice sheet may be used, either man-made or natural, provided the water within the opening freezes and embeds the probe. The probe may be suspended from a buoy or off the side of a float when the water is ice-free. As ice forms at the water's surface, the probe becomes embedded in the ice sheet.

In any event, the probe is embedded within the ice sheet. Preferably, the probe is embedded so that at least a portion of its lower end is in contact with the sea water. In most circumstances, the ice sheet should be at least one foot thick to support the necessary equipment.

The probe includes a circuit having two parallel wires 16 of known electric resistance or resistivity. The probe also includes a frame assembly 17 which spaces the wires 16 apart in a substantially vertical orientation. The circuit also includes a clip 21 made of a highly conductive material, such as metal. Preferably, the circuit is also embedded so that at least a portion of it is in contact with the sea water. The wires 16 exit the probe at its upper end 18 and connect to a transducer 20 which is connected by a wire 22 to a meter 24. The meter is connected to a power source 25 which is used to generate current. When the power is turned on, the transducer converts the current which passes through the wires 16 to a desired signal such as voltage. This signal is then transmitted along the wire 22 to the meter 24. The meter 24 may read the input voltage directly or, alternatively, convert the voltage or other input variable into ohms or a thickness reading. The meter 24 may be connected to a strip-chart recorder 26 or the like to continuously record the data for a period of time.

The wires 16 are the principal elements of the circuit. In open air, when a current is passed through the circuit, the resistance measured is that of the wires along their entire length, in addition to the resistance of the clip 21 or similar connector. Obviously, the wires 16 may be attached together directly at the bottom end of the probe thereby eliminating the need for a clip. However, in sea water because of its high conductivity, the circuit is shorted out once it contacts the water. The length of the wire 16 that the current passes through is reduced to that portion of the wire 16 above the water surface. In other words, the effective circuit of the probe is only that portion of the wires above the water surface (line 27 of FIG. 1). This results in a reduced resistance reading at the meter 24.

As ice develops at the surface, the effective circuit is lengthened by lowering the point along the length of the wires 16 at which the sea water acts as the connector between the wires 16 and shorts out the circuit. Since ice has a large resistance, it acts as an insulator preventing the flow of current between the wires.

Thus, as the ice thickens, the effective circuit increases thereby increasing the resistance measured at the meter 24. To verify the operating principle of the present invention, the following experiment was conducted.

EXPERIMENT

Figure 2:
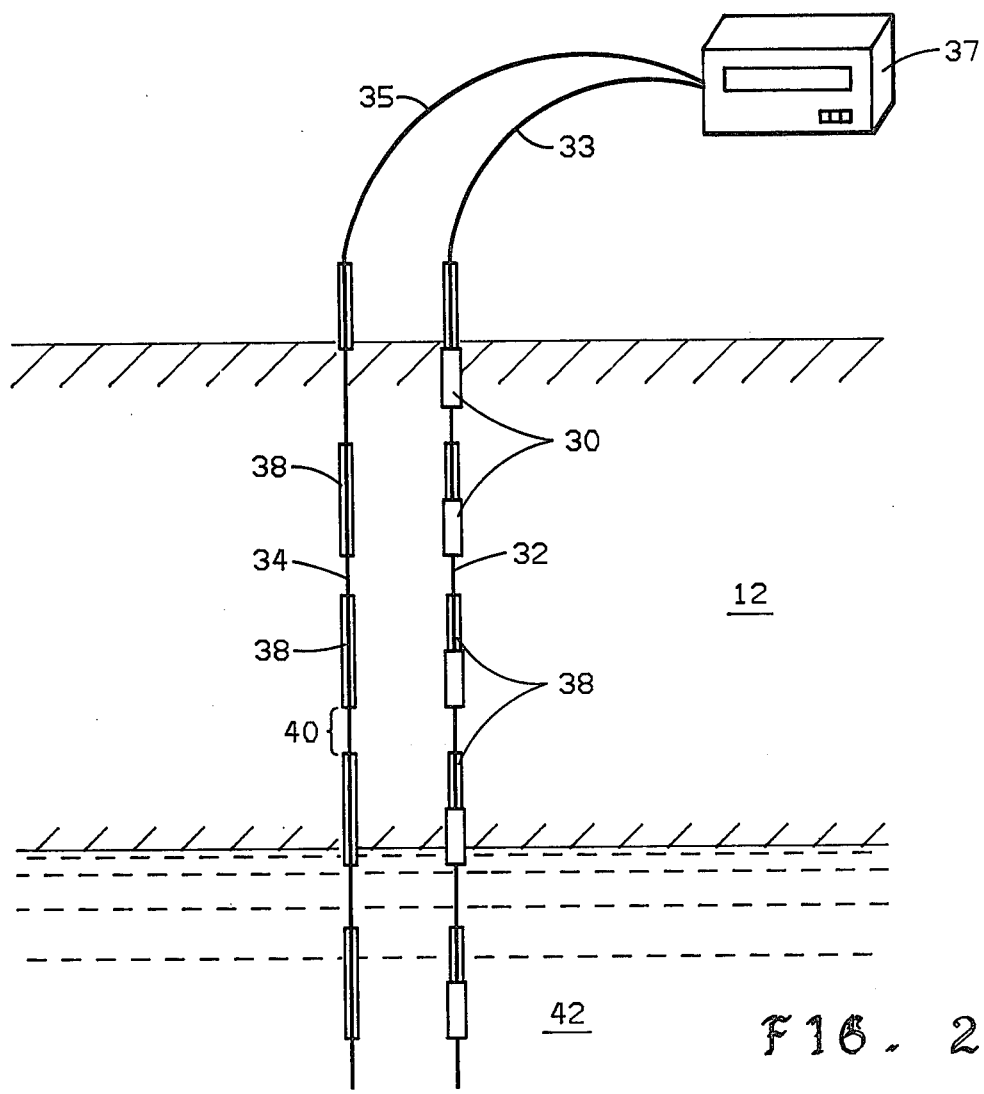
FIG. 2 is a laboratory model of an electric resistance probe used to test the principles of the present invention under simulated arctic conditions.
Figure 3:
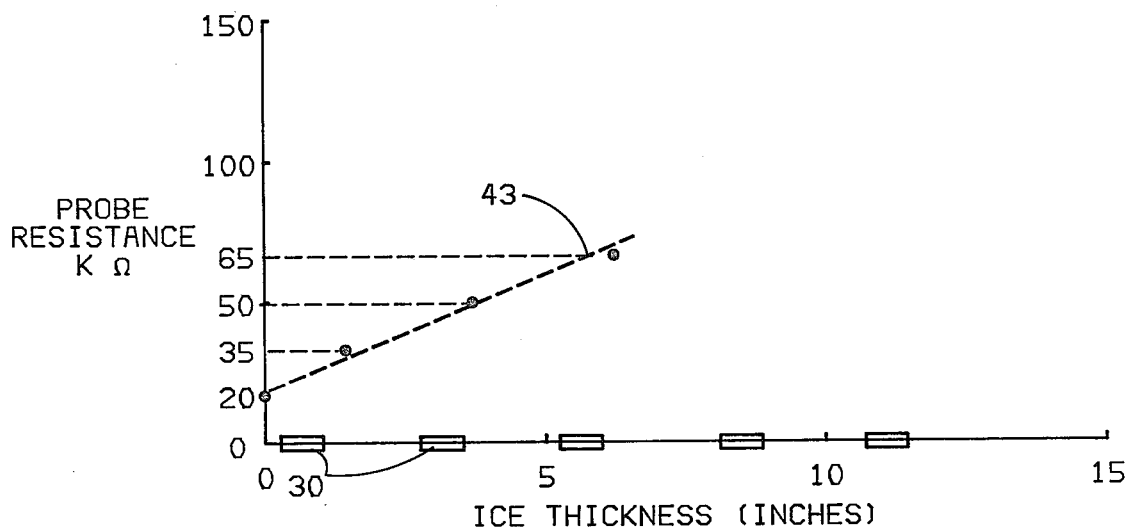
FIG. 3 is a correlation between the measured electric resistivity of the experimental probe and the thickness of a test ice sheet.

With reference to FIGS. 2 and 3, several 15 K-ohm resistors 30 were placed in series along a wire 32. A second wire 34 was installed substantially parallel to the first wire 32. The wires were connected by leads 33 and 35 to a resistance meter 37 (model no. 1657 RLC Digibridge manufactured by the Gen Rad Corporation of Concord, Massachusetts). The wires 32 and 34 correspond to the wires 16 of FIG. 1. In this manner, a circuit similar to that illustrated in FIG. 1 was constructed. Both wires 32 and 34 were insulated (insulation 38) along their length except for certain exposed regions 40 which had direct contact with a test ice sheet 12. Because of the well known ion polarization problem associated with measuring an electric resistance with a direct current in an electrolyte solution (sea water in this case), an alternating current was used and is preferred.

Initially, the wires 32 and 34 were supported in a tank of water 42. A fine layer of ice was formed by sprinkling ice dust on the water surface. The resulting ice sheet was permitted to grow from the surface of the water downwardly.

The resistors 30 serve to increase the overall resistance of the test circuit. In this manner, variations in the measured resistance of the circuit are more pronounced. This was important because the resistivity of the wires 32 and 34 was fairly small and, therefore, susceptible to interference from outside parameters such as laboratory equipment.

FIG. 3 is a graph of the measured resistance from the test circuit as a function of the ice sheet thickness actually measured by hand. Meter output readings were manually recorded at predetermined intervals as the ice sheet thickened covering sequential regions 40 of the test circuit. FIG. 3 illustrates that a linear relationship (line 43) exists between the electric resistance of the test circuit and the thickness of the ice sheet 12. Because of the use of the resistors 30, an increase in the resistance of the test circuit would not occur until the ice extended downwardly below the next resistor 30 thereby including such resistor in the test circuit. Thus, the data points in FIG. 3 may be more accurately described as a step-function. The ordinate axis of FIG. 3 illustrates that as sequential resistors 30 are covered by the ice sheet, the total measured resistance of the test circuit increased by 15 K-ohms (the rated resistance of each resistor 30). In the field a larger probe would be used, such as that illustrated in U.S. Pat. No. 3,735,638, which would include a circuit having wires that contacted the ice over their entire length (see FIG. 1) and not merely at isolated points. Such a circuit is not sensitive at selected point only. Rather, it senses change in resistance along its entire length.

Thus, as indicated by the experiment, it is possible to measure the thickness of an ice sheet with a circuit whose resistance is a function of the length of the circuit embedded in the ice. A calibration curve, similar to that shown in FIG. 3, would be generated for each circuit thereby enabling a direct correlation between the output reading of the meter and the ice thickness. Such a calibration curve may be pre-set internally within the meter 24, as previously mentioned.

The present invention also permits the monitoring of the re-freezing of the water within the hole 10 after a thawing period. If the hole 10 is a type of natural opening in the ice known as a "tidal crack", the water within the crack around the circuit would thaw and refreeze with substantial tidal fluctuations. This would be of interest to someone studying the local meterological conditions or the like.

The present invention has been described in terms of a preferred embodiment. Modifications and alternations to this embodiment will be apparent to those skilled in the art in view of this disclosure. It is, therefore, Applicants' intention to cover all such equivalent modifications and variations which fall within the spirit and scope of this invention.

What is claimed is:

1. A method for measuring the thickness of an ice sheet floating at the surface of a body of water with a circuit whose resistance is a function of the length of the circuit embedded in the ice, said method comprising the steps of:
   (a) transmitting an electric current through the circuit;
   (b) measuring the electric resistance of the circuit as the current passes through the circuit; and
   (c) determining the thickness of the ice sheet by correlating the measured resistance of the circuit with predetermined calibrated ice thickness values.

2. The method according to claim 1 wherein the circuit extends through the ice sheet so that at least a portion of the circuit contacts the water below the ice sheet.

3. The method according to claim 1 wherein steps (b) and (c) are performed continuously over a predetermined length of time to monitor continuously the thickness of the ice sheet.

4. The method according to claim 1 wherein the thickness of the ice sheet is at least one foot.

5. A method for measuring the thickness of an ice sheet floating at the surface of a body of water with a circuit whose resistance is a function of the length of the circuit embedded in the ice, said method comprising the steps of:
(a) placing the circuit through the surface of the body of water before the ice sheet begins to form;
(b) transmitting an electric current through the circuit;
(c) measuring the electric resistance of the circuit as the current passes through the circuit; and
(d) determining the thickness of the ice sheet by correlating the measured resistance of the circuit with predetermined calibrated ice thickness values.

6. A method according to claim 5 wherein steps (b), (c) and (d) are continuously performed over a predetermined length of time to continuously monitor the thickness of the ice sheet.

7. A method for measuring the thickness of an ice sheet floating at the surface of a body of water with a circuit resistance is a function of the length of the circuit embedded in the ice, said method comprising the steps of:
(a) excavating a hole through the ice sheet;
(b) inserting the circuit into the hole;
(c) allowing ice to form within the hole between the circuit and the ice sheet so that at least a portion of the circuit is embedded within the ice sheet;
(d) transmitting an electric current through the circuit;
(e) measuring the electric resistance of the circuit as the current passes through the circuit; and
(f) determining the thickness of the ice sheet by correlating the measured resistance of the circuit with predetermined calibrated ice thickness values.

8. A method according to claim 7 wherein steps (d), (e) and (f) are continuously performed over a predetermined length of time to continuously monitor the thickness of the ice sheet.

* * * * *